(12) United States Patent
Hsu

(10) Patent No.: US 8,126,645 B2
(45) Date of Patent: Feb. 28, 2012

(54) DIRECTION INDICATION DEVICE OF A GLOBAL POSITIONING SYSTEM

(76) Inventor: Cheng-Chien Hsu, Sijhih (TW)

( * ) Notice: Subject to any disclaimer, the term of this patent is extended or adjusted under 35 U.S.C. 154(b) by 0 days.

(21) Appl. No.: 12/193,859

(22) Filed: Aug. 19, 2008

(65) Prior Publication Data

US 2010/0292925 A1 Nov. 18, 2010

(51) Int. Cl.
*G01C 21/00* (2006.01)
*G01S 19/42* (2010.01)

(52) U.S. Cl. .......... 701/457; 701/432; 701/436

(58) Field of Classification Search .......... 701/211, 701/207, 213, 202; 340/815.78, 815.42, 340/815.45, 815.54, 815.73
See application file for complete search history.

(56) References Cited

U.S. PATENT DOCUMENTS

| | | | | |
|---|---|---|---|---|
| 5,184,123 A * | 2/1993 | Bremer et al. | ........... | 340/995.27 |
| 5,654,892 A * | 8/1997 | Fujii et al. | ..................... | 701/211 |
| 5,731,766 A * | 3/1998 | Akamatsu | .................... | 340/988 |
| 5,890,089 A * | 3/1999 | Ogino et al. | ................. | 701/211 |
| 6,285,952 B1 * | 9/2001 | Kim | ................................ | 701/211 |
| 6,735,517 B2 * | 5/2004 | Engelsberg et al. | .......... | 701/209 |
| 7,522,068 B2 * | 4/2009 | Kooi et al. | ............... | 340/995.14 |
| 7,737,842 B2 * | 6/2010 | Shyur et al. | ................ | 340/539.2 |
| 2005/0187710 A1 * | 8/2005 | Walker | ........................ | 701/211 |
| 2006/0139184 A1 * | 6/2006 | Hong | ........................ | 340/995.1 |
| 2008/0186227 A1 * | 8/2008 | Shyur et al. | .............. | 342/357.06 |
| 2008/0234932 A1 * | 9/2008 | Lee | ................................ | 701/213 |
| 2011/0115647 A1 * | 5/2011 | Mukaiyama | ................. | 340/907 |

* cited by examiner

*Primary Examiner* — Khoi Tran
*Assistant Examiner* — Jason Holloway
(74) *Attorney, Agent, or Firm* — Leong C. Lei

(57) ABSTRACT

A direction indication device of a global positioning system which is composed of a host having a voice device and a display panel. An exterior of the display panel is enclosed with a cover, on which an indication unit is installed and includes at least one illumination element. Each illumination element represents a direction indication. An interior of the host also includes a navigation module which produces a navigation signal and a direction indication module which produces an indication signal on the indication unit. After the direction indication module has received the navigation signal, the illumination element representing the direction will produce light to represent the direction indicated by the navigation signal, such that a driver can be indicated the direction on the display panel without watching at the global positioning system.

1 Claim, 4 Drawing Sheets

DIRECTION INDICATION DEVICE OF A GLOBAL POSITIONING SYSTEM

BACKGROUND OF THE INVENTION a) Field of the Invention

The present invention relates to a global positioning system, and more particularly to a direction indication device of a global positioning system, which produces light for direction indication such that a driver can be indicated with the driving direction through the indication light.

b) Description of the Prior Art

In modern life, convenience is very important to most people; therefore, a lot of electronic devices are emerging continuously, such as global positioning systems or cellular phones which can add a lot of convenience to human lives.

Following progressiveness of technology, many electronic products that can increase convenience in daily life are also continuously advancing, and the technology of satellite navigation also progresses significantly so that functions of the products are improved continuously by vendors of the satellite navigation devices to attract consumers. Such improvements include the improvement in the quality of navigation, the operation interface, the display screen and the size, as well as the design toward a lightweight and compact satellite navigation device.

However, when using the global positioning system, a lot of drivers will install the global positioning system on a fixing bracket which is located at a place where the global positioning system is easily seen; therefore navigation information displayed on a screen of said global positioning system can be directly seen when driving, such that the drivers can be aware of a direction or a location to turn. In addition, the global positioning system is also provided with a voice system to inform the driver of the direction or location to turn by voice, thereby achieving the function of navigating through the voice system and the navigation information on the screen.

Nevertheless, in using the aforementioned global positioning system, the following problems and shortcomings have to be improved.

The driver has to completely put his or her line of sight on the screen of the global positioning system to be aware of the direction or location to turn. Therefore, when viewing the screen, the attention used for driving will be decreased easily, and will easily result in a dangerous situation when driving at the same time. Moreover, when an ordinary driver is driving, he or she will usually play music or listen to broadcasting; therefore, when the driver needs to know the direction or location to turn from the voice system, the sound of the voice device will come out along with the sound of music or broadcasting, thereby further prohibiting the driver from accurately knowing the direction informed by the voice device.

Accordingly, the aim of the present invention is to solve the aforementioned problems and shortcomings of the prior art through improvement with research and development by the present inventor and related vendors.

SUMMARY OF THE INVENTION

The primary object of the present invention is to provide a direction indication device of a global positioning system, wherein a host of the global positioning system is provided with a direction indication module which is connected to a navigation module by a signal, with the navigation module producing a navigation signal to a display panel, the direction indication module producing an indication signal according to the navigation signal, and the indication signal being displayed on an indication unit.

Another object of the present invention is to provide a direction indication device of a global positioning system, wherein the indication unit includes at least one illumination element, with each illumination element being installed at a spacing and conducting indication of all direction according to the direction indicated by the navigation signal, thereby allowing the driver to be clearly aware of the direction indication through the indication light produced by the indication unit.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
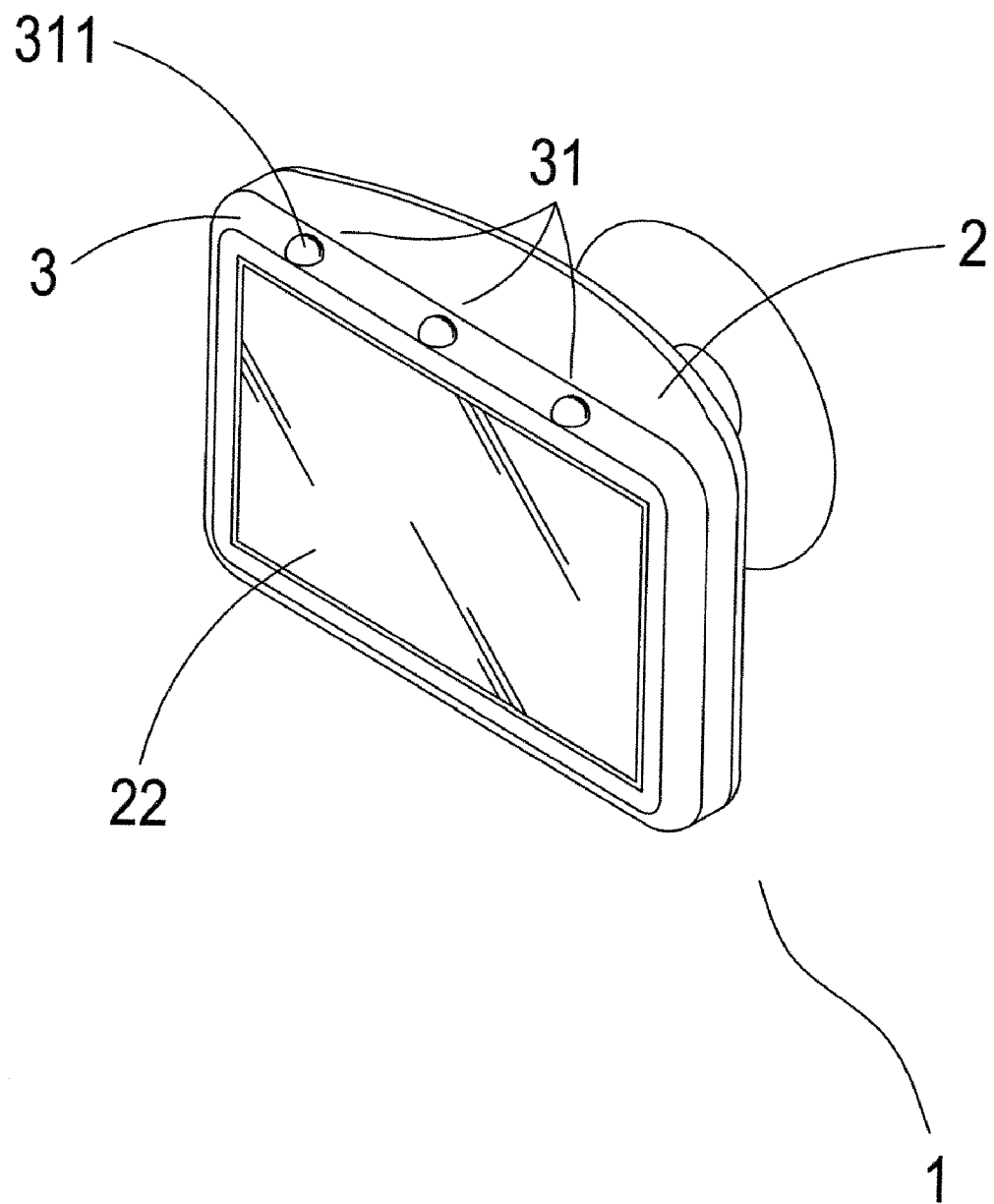
FIG. 1 shows a three-dimensional view of a preferred embodiment of the present invention.
Figure 2:
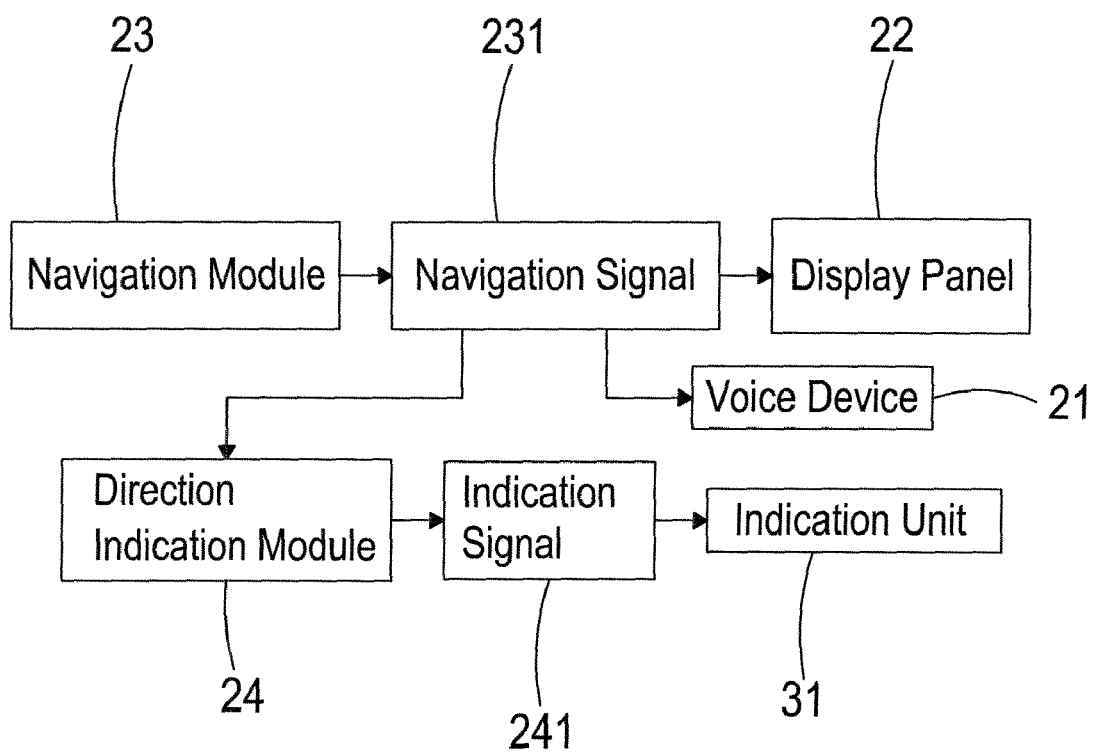
FIG. 2 shows a block diagram of a preferred embodiment of the present invention.

FIG. 1 and FIG. 2 illustrate a three-dimensional view and a block diagram, of a preferred embodiment of the present invention. A global positioning system 1 comprises primarily a host 2, an interior of which is provided with a voice device 21 and a side of which is provided with a display panel 22. An exterior of the display panel 22 is enclosed with a cover 3, a proper position on which is provided with an indication unit 31. The interior of the host 2 is also provided with a navigation module 23 which can produce a navigation signal 231 and a direction indication module 24 which can produce an indication signal 241. The navigation signal 231 is produced in the display panel 22 and the voice device 21, whereas the indication signal 241 is produced in the indication unit 31 which includes at least one illumination element 311, with one illumination element 311 being separated with another by a proper spacing.

Figure 3:
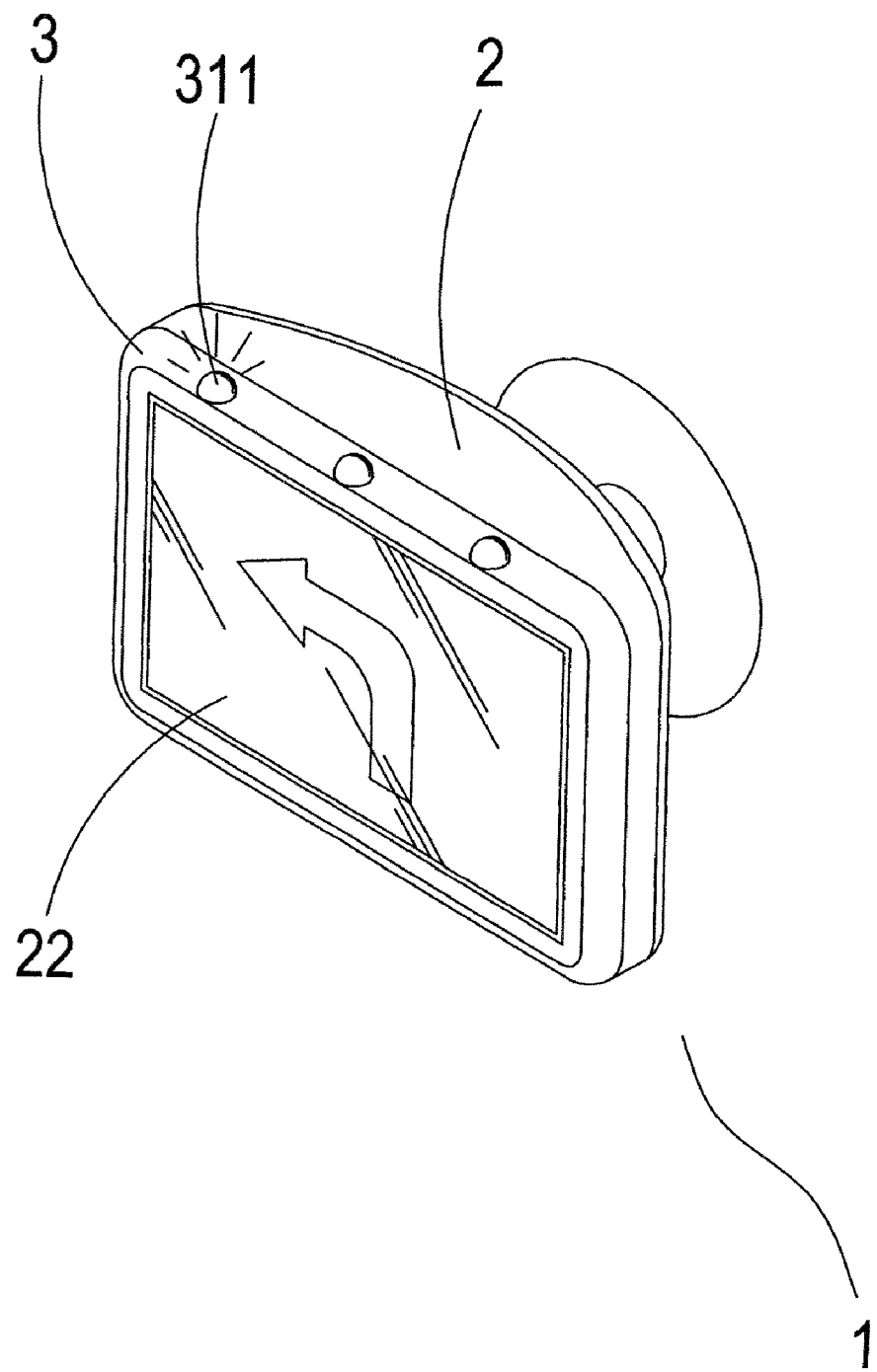
FIG. 3 shows a first schematic view of an implementation of a preferred embodiment of the present invention.
Figure 4:
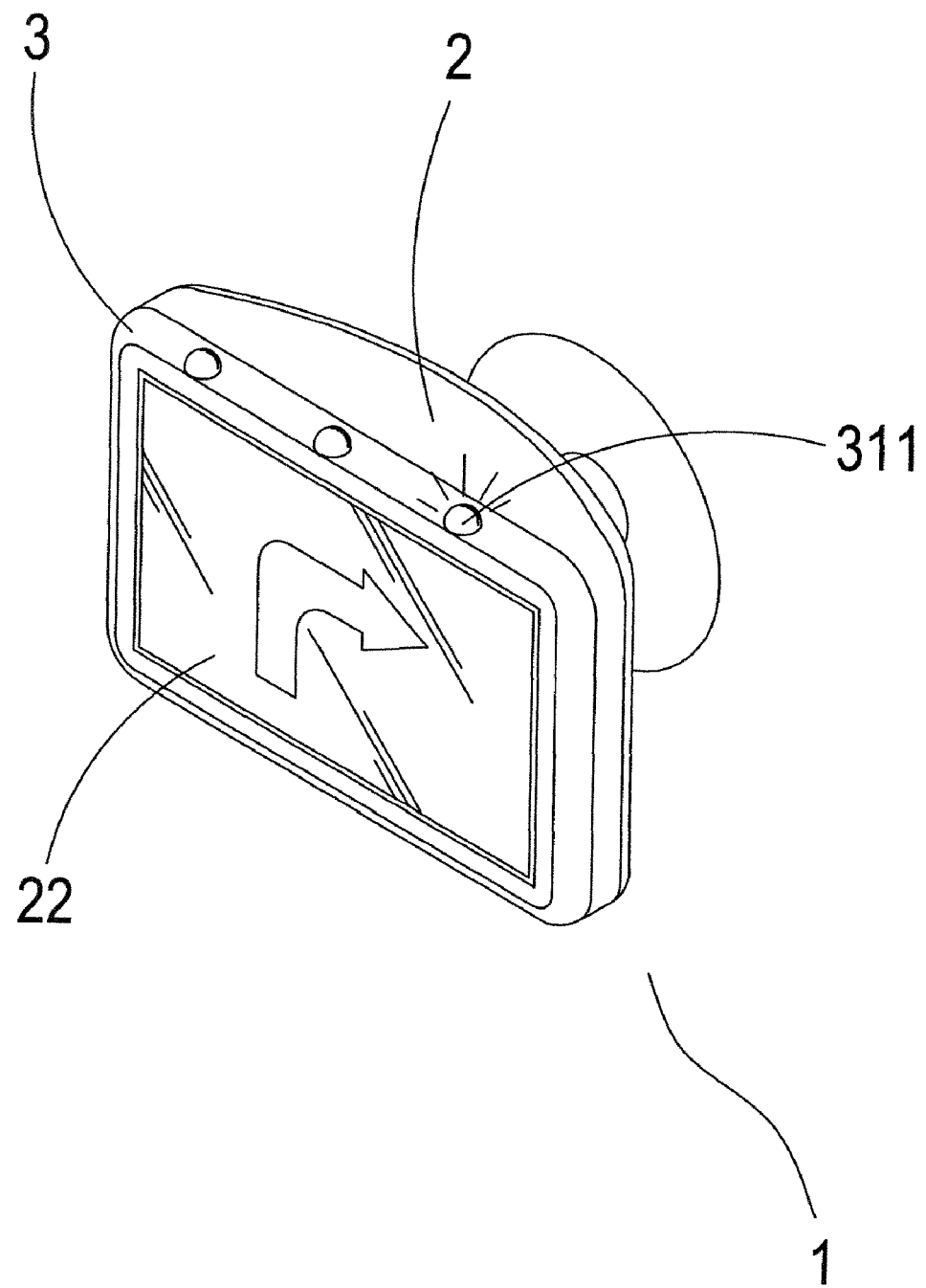
FIG. 4 shows a second schematic view of an implementation of a preferred embodiment of the present invention.

FIGS. 2 to 4 illustrate a block diagram, a first schematic view of an implementation and a second schematic view of an implementation, of a preferred embodiment of the present invention. When a driver is using the global positioning system 1, he or she will fix the global positioning system 1 at a place where the global positioning system 1 is easily seen, and configure a route and a destination for navigation through the display panel 22. The navigation module 23 will then search for satellites, plan the route and produce the navigation signal 231 on the display panel 22 to show a direction indication, such as a left turn, a forward turn or a right turn, allowing the driver to drive in reference to the planned route displayed on the display panel 22. In addition, the global positioning system 1 is provided with the voice device 21 which can produce voices to inform the driver, simultaneously corresponding to the direction indication on the display panel 22, allowing the driver to know the direction indication through the voice device 21 at the same time. After the navigation signal 231 has been produced by the navigation module 23, the navigation signal 231 is transmitted to the direction indication module 24 which produces the indication signal 241 on the indication unit 31 after receiving the navigation signal 231. Moreover, the indication unit 31 includes at least one illumination element 311, with each illumination element 311 representing a direction indication. After the indication unit 31 has received a left-turn indication signal 241, an illumination element 31 representing the left-turn will produce light which can further be a flashing light, such that the driver can see the light of said illumination element 311 while watching the road condition, which further enables the driver to know the direction informed by the display panel 22 without watching the global positioning system 1.

On the other hand, after the indication unit 31 has received a right-turn indication signal 241, an illumination element 311 representing the right-turn will produce light, such that the driver can see the light of said illumination element 311 while watching the road condition, which further enables the driver to know the direction informed by the display panel 22 without watching the global positioning system 1.

Referring to all the drawings, the present invention is provided with following advantages in comparison with the prior art:

1. The direction indication module 24 in the host 2 is connected to the navigation module 23 by the signal, the navigation module 23 produces the navigation signal 231 to the display panel 22, and the direction indication module 24 produces the indication signal 241 according to the navigation signal 231; whereas, the indication signal 241 is displayed on the indication unit 31, such that the driver can be aware of the direction indicated by the display panel 22 from the indication unit 31 without watching at the global positioning system 1.

2. The indication unit 31 includes at least one illumination element 311, said illumination element 311 is separated with another by a spacing and indicates each direction depending upon the direction indication of the navigation signal 231 in order to represent the indication of every direction, such that the driver can clearly know the direction indication through the indication light produced by the indication unit 31.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. In a global positioning system comprising a host having a side provided with a display panel, said display panel being enclosed with a cover, a navigation module provided in an interior of said host, and a voice device provided in said interior of said host, the improvement wherein an indication unit is provided on a top of said cover and has three illumination elements, said three illumination elements being arranged so that a first one of said illumination elements being positioned at a left side of said top of said cover, a second one of said illumination elements being positioned at a right side of said top of said cover, and a third one of said illumination elements being positioned between said first and second ones of said illumination elements, and when a driver configures a route and a destination for navigation through said display panel, said navigation module will search for satellites, plan said route and produce a navigation signal on said display panel to show a direction indication such as a left turn signal, a forward signal, or a right turn signal, said voice device produces voices to inform said driver simultaneously corresponding to said direction indication on said display panel thereby allowing said driver to know said direction indication through said voice device at the same time, and said navigation signal is transmitted to a direction indication module which produces an indication signal on said indication unit to cause a corresponding one of said illumination elements to flash, thereby notifying said driver of said direction indication by means of an image on said display panel, voices from said voice device and flashing light for a corresponding one of said illumination elements at the same time.

* * * * *